United States Patent Office 3,763,271
Patented Oct. 2, 1973

3,763,271
METHOD FOR INTRODUCING IMIDO-ALKYLENE-SUBSTITUTION INTO AROMATIC CARBOCYCLIC ORGANIC POLYMERS
Johann F. Klebe and Thomas J. Windish, Schenectady, N.Y., assignors to General Electric Company
No Drawing. Continuation-in-part of abandoned application Ser. No. 838,322, July 1, 1969. This application June 23, 1971, Ser. No. 156,066
Int. Cl. C08g *20/00*
U.S. Cl. 260—78 UA                 20 Claims

ABSTRACT OF THE DISCLOSURE

A Friedel-Crafts' alkylation method is provided for introducing imido-alkylene substitution, such as maleimido-methylene-substitution, into a variety of organic polymers having chemically-combined aromatic carbocyclic organic radicals, as pendant radicals along the polymer chain, such as polystyrene, poly(styrene-vinylic or, dienic copolymers or terpolymers) etc. Reaction is effected between an imido-methylene compound and an organic polymer having chemically-combined aromatic carbocyclic organic radicals in the presence of a Friedel-Crafts' catalyst, such as boron trifluoride. The imido-alkylene-substituted aromatic carbocyclic organic polymers can be employed in making molding compounds, laminates, varnishes, etc.

---

This application is a continuation-in-part of our copending application Ser. No. 838,322, filed July 1, 1969, now abandoned and assigned to the same assignee as the present invention.

The present invention relates to a method for introducing imido-alkylene-substitution into a variety of aromatic carbocyclic organic polymers by a Friedel-Crafts' alkylation reaction.

Polyimides are generally recognized as valuable solvent-resistant and temperature-resistant high performance polymers. It also is known generally that the introduction of imido radicals into various organic ploymers can enhance the solvent resistance and impart other benefits to such organic polymers. Numerous methods for making polyimides have been developed, as shown, for example, by Holub U.S. Pat. 3,410,875 and 3,435,002, assigned to the same assignee as the present invention. As shown in these patents a wide variety of useful polyamide acids and polyimides can be made from organic dianhydrides and organic diamines. The interconendsation method cannot be employed to introduce imido-functionality into a wide variety of commercially available aromatic organic polymer unless the aromatic organic polymer has chemically-combined anhydride radicals or amine radicals in the backbone or terminal position. Water also is formed as a result of the interconendsation, which can further complicate efforts to introduce imido-substitution. As a result, alternate routes are constantly being sought by the chemical indusry for introducing imido-substitution into aromatic organic polymers to improve the properties of such materials.

The present invention is based on discovery that organic polymers having chemically-combined aromatic carbocyclic organic radicals, can be imido-substituted by effecting reaction in the presence of a Friedel-Crafts' catalyst between the organic polymer, and an imido-alkylene compound of the formula, (I) 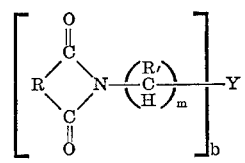

where R is a divalent organic radical selected from the class consisting of divalent hydrocarbon radicals and halogenated divalent hydrocarbon radicals, and R' is selected from hydrogen, monovalent hydrocarbon radicals, and halogenated monovalent hydrocarbon radicals, Y is a halogen, hydroxy, or oxygen radical, and $m$ is an integer having a value of from 1 to 4 inclusive, and $b$ can be 1 or 2.

Radicals included by R, are, for example, arylene radicals, such as phenylene, biphenylene, naphthylene, anthrylene, etc., alkylene radicals, such as ethylene, trimethylene, tetramethylene, etc., halogenated arylene and alkylene radicals such as chlorophenylene, chloronaphthylene, chloroethylene, chlorotrimethylene, etc.; aliphatically unsaturated radicals such as,

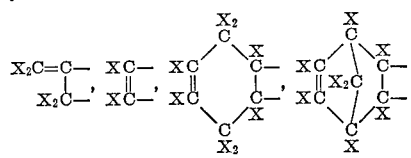

where X is a radical selected from hydrogen, lower alkyl, halogen, or mixtures thereof, such as chloro, methyl, ethyl, propyl, bromo, etc. Monovalent and hydrocarbon radicals included by R' are, for example, phenyl, chlorophenyl, methyl, ethyl, propyl, butyl, pentyl, hexyl, heptyl, octyl, etc.

There is provided by the present invention, a method which comprises (1) effecting contact between (A) an organic polymer and (B) an imido-alkylene compound of Formula (1), in the presence of an effective amount of (C) a Friedel-Crafts' alkylation catalyst, and (2) recovering from the mixture resulting from (1) organic polymer having at least one chemically-combined imido radical of the formula, (2) 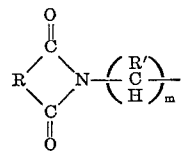

where (A) is an organic polymer selected from organic polymers having chemically-combined aromatic carbocyclic radicals in the polymer backbone of the formula, (3) 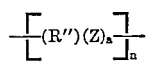

and organic polymers having chemically-combined pendant aromatic carbocyclic radicals of the formula, (4) 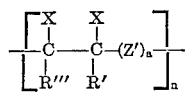

R" is a polyvalent organo radical in the organic polymer backbone selected from (a) aromatic carbocyclic radicals selected from hydrocarbon radicals and halogenated hydrocarbon radicals,
(b) a mixture of polyvalent organo radicals selected from hydrocarbon radicals and halogenated hydrocarbon radicals containing from about 1 mole percent to 99.9 mole percent of (a) radicals, based on the total moles of such polyvalent organo radicals, R''' is a pendant monovalent organo radical selected from (c) aromatic carbocyclic radicals selected from hydrocarbon radicals and halogenated hydrocarbon radicals, and
(d) a mixture of monovalent organo radicals selected from hydrocarbon radicals and halogenated hydrocarbon radicals containing from about 1 mole percent to 99.9 mole percent of (c) radicals, based on the total moles of such monovalent organo radicals, Z is a polyvalent organo radical such as,

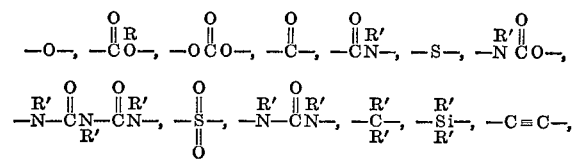

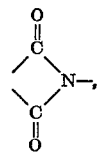

etc., and mixtures thereof, Z' is a divalent organo radical, such as,

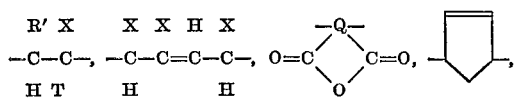

etc., and mixtures thereof, where R' and X are as previously defined, Q is polyvalent aliphatic radical derived from aliphatically unsaturated R radicals previously defined, T is a monovalent radical selected from hydrogen, alkyl radicals, for example, methyl, ethyl, propyl, etc., halogen radicals, aliphatic ester radicals, aromatic ester radicals, amido radicals, nitrile radicals and aliphatic nitrile radicals, $a$ is a whole number equal to 0 or 1, and $n$ is an integer having a value of from 1 to 1,000 inclusive, and preferably from 5 to 500 inclusive.

Radicals included by R" of Formula 3 are phenylene, tolylene, xylylene, naphthylene, anthrylene, etc.; halogenated derivatives of such aromatic carbocyclic radicals, alkylated derivatives of such aromatic carbocyclic radicals; a mixture of such aromatic carbocyclic radicals, or derivatives of such aromatic carbocyclic radicals, and other polyvalent hydrocarbon radicals or halogenated polyvalent hydrocarbon radicals, which mixture contains at least about 1 percent and preferably about 10 mole percent to 99 mole percent of such aromatic carbocyclic radicals or derivatives thereof and up to 99 mole percent, and preferably up to about 90 mole percent of divalent radicals such as alkylene radicals, for example, methylene, ethylene, trimethylene, etc., halogenated derivatives thereof, etc.

Radicals included by R''' of Formula 4 are, for example, phenyl, tolyl, xylyl, naphthyl, anthryl, etc.; halogenated derivatives of such monovalent aromatic carbocyclic radicals; alkylated derivatives of such monovalent carbocyclic radicals; a mixture of such aromatic carbocyclic radicals, and other monovalent hydrocarbon radicals or halogenated hydrocarbon radicals, which mixture contains at least about 1 mole percent and preferably 10 mole percent to 99 mole percent of such aromatic carbocyclic radicals, or derivatives thereof, and up to about 99 mole percent and preferably up to 90 mole percent of monovalent radicals such as alkyl radicals, for example, methyl, ethyl, propyl, butyl, etc.; halogenated derivatives thereof, etc.

One method for making the imido-alkylene compounds included by Formula 1, is by effecting reaction at a temperature in the range of between about 50° C.–150° C. between the potassium salt of the imide precursor and an excess of the appropriate α,ω-dihalo or halo, hydroxy alkylene in the presence of a suitable organic solvent such as dimethyl sulfoxide.

Included by the imido-alkylene compounds of Formula 1, are alkylene and cycloalkylene imido-alkylene compounds, such as,

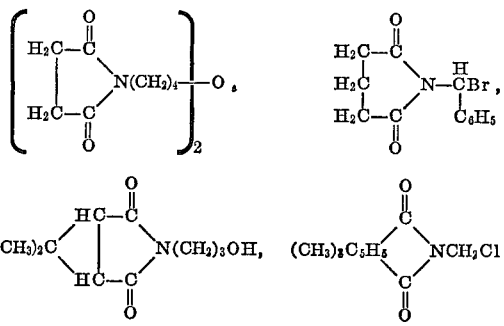

aromatic imido-alkylenehalides, for example,

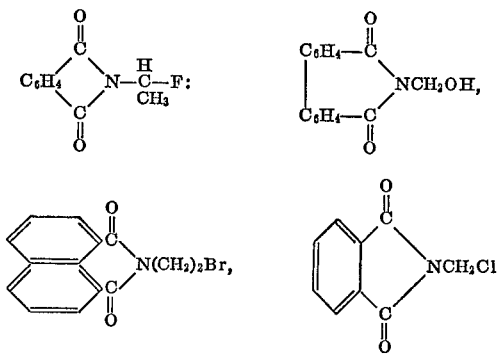

aliphatically unsaturated imido-alkylene compounds of the formulas,

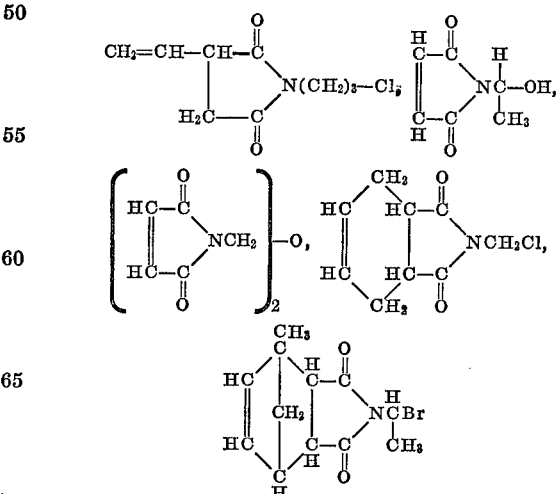

etc.

Among the aromatic organic polymers having chemically-combined units of Formula 3, there are included polyethers, polyesters, polycarbonates, polyamides, polyamideimides, polysulfones, polyurethanes, polyimides, polybiurets, polyxylylene, polyarylacetylenes, polyphenylenes, polysulfides, etc. Among the aromatic organic polymers, having chemically-combined units of Formula 4, there are included polystyrene, poly(α-methylstyrene), poly(methyl-α-methylstyrene), poly(dimethylstyrene), poly(chlorostyrene), poly(dichlorostyrene), styrene copolymers and terpolymers with butadiene, acrylonitrile, methylmethacrylate, vinylidenechloride, maleic anhydride, vinylchloride, vinylacetate, α-methylstyrene, etc.

The aromatic organic polymers which can be employed in the practice of the invention, also can include random, block, or graft copolymers containing at least 10 mole percent of units of Formula 3 or 4, chemically-combined with up to 90 mole percent, or less of units free of aromatic carbocyclic. For example, there can be employed in the practice of the invention polystyrene-polybutadiene graft copolymers.

The Friedel-Crafts catalysts which can be employed in the practice of the invention are well-known and include, for example, boron trifluoride, aluminum chloride, stannic chloride, ferric chloride, zinc chloride, concentrated sulfuric acid, toluene sulfonic acid, etc.

As shown in copending applications of Holub and Evans, Ser. No. 838,306, 836,315, 838,314, of Klebe and Windish, Ser. No. 846,623, and of Holub and Emerick, Ser. No. 838,316, filed concurrently herewith and assigned to the same assignee as the present invention, the method of the present invention can be employed to introduce imido-substituted radicals into a variety of aromatic carbocyclic polymers having chemically-combined units shown by Formulas 3 and 4, such as polyaryleneoxides, polyarylenecarbonates, polyaryleneamides, polyarylene esters, polystyrenes, etc.

In the practice of the method of the invention, contact is effected between the aromatic organic polymer and the imido-alkylene compound in the presence of a Friedel-Crafts' catalyst to introduce imido-alkylene-substitution into the aromatic organic polymer.

Temperatures which can be employed can vary over a range of from −50° C. to 200° C. and preferably from 0° C. to 150° C. The alkylation of the aromatic organic polymer can be effected in the presence of a suitable inert organic solvent. Any organic solvent can be employed which is inert to the reactants under the conditions of the reaction and which facilitates contact between the aromatic organic polymer and the imido-alkylene compound. Suitable organic solvents include, for example, methylene chloride, chloroform, tetrachloroethane, chlorobenzene, carbodisulfide, nitromethane, nitrobenzene, and other solvents with electronegative substituents or mixtures of such solvents. Reaction can be effected between the imido-alkylene compound of the aromatic organic polymer in the presence of an effective amount of the Friedel-Crafts' catalyst which can be employed over wide ranges of concentration. An effective amount is that amount of catalyst which provides for the production of imido-substituted organic polymer at satisfactory yields. Experience has shown that effective results can be achieved if the catalyst concentration is employed at at least 1 mole percent, based on the total moles of imido-alkylene compound and chemically-combined aromatic organic units of Formula 3 or 4 in the reaction mixture preferably from about 5 mole percent to 100 mole percent. Higher or lower amounts can be utilized without adversely affecting the results desired but special techniques or procedures may be required.

Reaction times will vary depending upon such factors as the temperature employed, degree of agitation, the type of imido-alkylene compound employed, the nature of the aromatic organic polymer, as well as the degree of imido-substitution desired in the final product. A period of from 1 hour or less, to as many as 48 hours or more will, therefore, not be unusual and under most circumstances effective results can be achieved, in about 2 hours to provide for at least about 5 mole percent of imido-substitution, based on the total moles of chemically-combined aromatic organic units in the polymer.

Experience has shown that during the alkylation of the aromatic organic polymer, substantially anhydrous conditions should be maintained to provide for optimum results. However, up to 1,000 parts of water per million parts of mixture can be tolerated. Recovery of the final imido-methylene-substituted aromatic organic polymer can be achieved by the use of a low molecular weight aliphatic alcohol into which a mixture can be poured to provide the separation of the final product. The imido-alkylene-substituted aromatic polymer can then be recovered by filtration, followed by standard drying techniques.

The imido-alkylene-substituted aromatic organic polymer provided by the present invention can be employed in a variety of applications depending upon such factors as the type of aromatic organic polymer, the degree of imido-alkylene-substitution in the polymer, and whether the imido-alkylene radicals, as shown by Formula 1, are aliphatically unsaturated, or free of aliphatic unsaturation. For example, in instances where the aromatic organic polymer has chemically-combined imido-alkylene radicals of Formula 1, which is aliphatically unsaturated, these materials can be employed in a variety of applications such as molding compounds, varnishes, adhesives, laminating compounds, solvent-resistant coatings, dielectrics, insulating coatings, and several other applications normally requiring free radical and high energy electron curable materials convertible from the thermoplastic to thermoset state, as more particularly shown for particular aromatic oganic polymers described in the aforementioned copending applications. In instances where the aromatic organic polymers are substituted with imido-alkylene radicals of Formula 1, which are free of aliphatic unsaturation, such aromatic organic polymers can provide for solvent-resistant coating compounds, molding resins, high temperature and oxidatively stable fibers and films, etc.

The imido-alkylene-substituted aromatic organic polymers of the present invention can be blended with various aliphatically unsaturated organic materials, such as aliphatically unsaturated organic monomers and certain aliphatically unsaturated organic polymers as well as organic polymers free of aliphatic unsaturation. Blends of the imido-alkylene-substituted aromatic organic polymers and the aforementioned organic monomers or polymers can be made over a wide proportion by weight. Experience has shown that there should be employed at least about 5 percent by weight of the imido-alkylene-substituted aromatic organic polymer to provide for cured products having improved characteristics. For example, if the imido-alkylene aromatic organic polymer has chemically-combined aliphatically unsaturated imido-alkylene radicals in Formula 1, the blend of the imido-alkylene-substituted aromatic organic polymer with the aforementioned organic materials can be employed in making laminating compounds, solventless varnishes, molding compounds, coating compositions, etc., depending upon the proportions of the imido-aliphatically unsaturated imido-alkylene-substituted aromatic organic polymer and the organic polymer or monomer utilized in the blend. Those skilled in the art would know, for example, that as the proportion of the imido-alkylene aromatic organic polymer having aliphatically unsaturated imido-alkylene radicals increased with respect to either the organic monomer or polymer in the blend, particularly where the mole percent substitution of the aliphatically unsaturated imido-alkylene radical on the aromatic organic polymer exceeded 25 mole percent or more, the degree of crosslinking of the blend would be sufficiently high to make the resulting cured product an ideal solvent-resistant coating or insulating material.

Included by the aliphatically unsaturated monomers that can be employed in combination with the imido-alkylene-substituted aromatic organic polymers of the present invention are, for example, styrene, bismaleimide, N-phenylmaleimide, vinylchloride, isobutylene, butadiene, isoprene, chlorotrifluoroethylene, 2-methylpentene-1; vinyl esters of organic carboxylic acids such as vinylformate, vinylacetate, acrylonitrile, vinylmethyl, methyl, butyl, etc., esters of acrylic and methacrylic acids, etc.; divinylbenzene, triallylcyanurate, triallyltrimellitate, and N-vinylphthalimide, N-allylphthalimide, N-allyltetrachlorophthalimide, vinyl siloxanes, etc. Among the organic polymers that can be employed in combination with the imido-alkylene-substituted aromatic organic polymers of the present invention are, for example, polyvinylchloride, polyethylene, polypropylene, polysulfones, polystyrene, polyurethane, organopolysiloxanes, polyesters, polyphenyleneoxides, epoxides, etc.

Cure of the imido-alkylene-substituted aromatic organic polymer, or blend thereof with any of the aforementioned organic monomers or polymers, or combination thereof, can be effected thermally, or by the use of conventional free radical initiators. Temperatures of from 50° C. to 300° C. can be employed while 100° C. to 200° C. has sometimes been found to be more desirable. Acceleration of the cure of the imido-alkylene-substituted aromatic organic polymer, or blend thereof, can be achieved with organic peroxides, such as dicumylperoxide, benzoylperoxide, tertiary butylperbenzoate, tertiary alkylperoxycarbonate, azodicarbonamides, 2,5-dimethyl, 2,5-bis(tertbutylperoxyhexane), etc. The peroxides can be employed from about 0.01 percent to about 5 percent by weight, based on the total weight of the blend. In addition, the imido-alkylene-substituted aromatic organic polymers or blends thereof, in addition to being curable by the aforementioned free radical initiators, can be cured with heat or radiation with high energy electrons, X-rays, ultraviolet lighting, etc., depending upon the crosslink density of the resulting imido-substituted aromatic organic polymer or blend thereof, desired.

In addition to the aforementioned aliphatically unsaturated monomers and organic polymers which can be blended with the imido-alkylene-substituted aromatic organic polymers of the present invention, there can be employed, by weight, fillers in proportions of from 0 to 200 parts of filler per 100 parts of the imido-alkylene-substituted aromatic organic polymer. Included by the fillers which can be employed are, for example, clay, ground quartz, silica, sand, carbon black, glass fibers, glass beads, carbon fiber, asbestos, etc. In addition, other ingredients such as solvents at from 60 percent to 90 percent by weight of the resulting curable composition also can be employed such as N-methyl pyrrolidone, dimethylacetamide, toluene, methylenechloride, as well as plasticizers such as dioctylphthalate, etc.

In order that those skilled in the art will be better able to practice the invention, the following examples are given by way of illustration and not by way of limitation. In these examples, all parts are by weight and all reaction mixtures are stirred during the introduction of the Friedel-Crafts' catalyst.

EXAMPLE 1

Boron trifluoride was passed into a solution at 55° C., while it was stirred consisting of 5 parts of a polystyrene having a molecular weight of 100,000, 1.83 parts of N-chloromethylmaleimide prepared in accordance with methods known to the art, 70 parts of anhydrous tetrachloroethane and 30 parts of anhydrous nitrobenzene. After 15 hours, a product was obtained by pouring the resulting mixture into methanol. Based on method of preparation and the infrared spectrum of the product which showed a strong carbonyl absorption at 1,720 cm.$^{-1}$, the product was identified as a maleimido-methylene-substituted polystyrene having about 25 mole percent of the phenyl radicals substituted with maleimidomethylene radicals based on the total moles of imido-substituted and unsubstituted phenyl radicals in the polystyrene. The identity of the polymer and the degree of substitution was further confirmed by elemental analysis. A thin film of the product containing about 1 percent of benzophenone was subjected to ultraviolet irradiation for 20 seconds. Those parts of the film that were exposed to the ultraviolet light were found to be insoluble in organic solvents. The product is useful as a photoresist.

EXAMPLE 2

Boron trifluoride was slowly bubbled into a solution of 5 parts of polystyrene having a molecular weight of about 100,000 and 2.65 parts of N-chloromethyl-5-norbornene-2,3-dicarboxylic imide and 70 parts of tetrachloroethane and 30 parts of nitrobenzene while the temperature is maintained at 55° C. over a period of about 12 hours. The imidomethylene alkylating agent was made from N-hydroxymethyl-5-norbornene-2,3-dicarboxylic imide employing thionylchloride in accordance with the method of the prior art. The mixture was then poured into methanol to effect the precipitation of the product. Based on method of preparation, the product was a polystyrene having chemically combined 5-norbornene-2,3-dicarboxylic imide radicals. The identity of the product was confirmed by its infrared spectrum.

EXAMPLE 3

Boron trifluoride was slowly introduced into a mixture of 5 parts of polystyrene and 4.9 parts of N-chloromethylphthalimide and 70 parts of anhydrous tetrachloroethane and 30 parts of anhydrous nitrobenzene over a period of 16 hours while the mixture was stirred and maintained at a temperature of 55° C. The mixture was then poured into methanol to effect a precipitation of product which was filtered and dried. Based on the method of preparation, the product was a polystyrene having chemically-combined phthalimido-methylene radicals. The identity of the product was confirmed by the characteristic carbonyl absorbance at 1,715 cm.$^{-1}$ in its infrared spectrum. The polymer is useful as a molding composition with increased softening temperature as compared to unsubstituted polystyrene.

EXAMPLE 4

Boron trifluoride is slowly introduced into a 10 percent solution of styrene-butadiene copolymer and N-chloromethylmaleimide in chlorobenzene. The styrene-butadiene copolymer is prepared in accordance with the method of Amos et al. Pat. 2,694,692 utilizing a mixture of 90 mole percent of butadiene and 10 mole percent of styrene. The N-chloromethylmaleimide is present in the mixture at about an equal molar amount to the styrene utilized in making the copolymer. The solution is stirred while the boron trifluoride is introduced over a period of about 15 hours at 25° C. The mixture is then poured into methanol and a product is precipitated. Based on the method of preparation, the product is styrene-butadiene copolymer having chemically-combined styryl radicals substituted with maleimidomethylene radicals.

A solution of the maleimido-methylene substituted copolymer in chlorobenzene is poured onto an aluminum substrate and the solvent is allowed to evaporate at a temperature below its boiling point. The resulting film containing about 2 percent by weight of benzophenone is irradiated with ultraviolet light for a period of about 2 minutes. The film is found to be insoluble in chlorobenzene and exhibits valuable dielectric and insulating properties.

EXAMPLE 5

The procedure of Example 3 was repeated, except that there was employed a solution of 10 parts of polystyrene in about 100 parts of chloroform, to which there was mixed a solution of about 3 parts of bis-maleimidomethyl ether in about 30 parts of nitrobenzene. The product was recovered by precipitation in methanol, it showed a strong carbonyl absorption in 1700 cm.$^{-1}$, where its infrared spectrum was examined. Based on method of preparation and its infrared spectrum, the product was substantially the same as the maleimido methyl substituted polystyrene prepared in Example 3.

A film of the product was cast from chloroform and exposed to ultraviolet light generated by a Hanovia lamp operated at about 450 watts, for approximately 20 seconds. Its solubility in chloroform was substantially reduced indicating it could be employed as a photoresist for etching various metals.

EXAMPLE 6

There was added to a solution of 2 parts of polystyrene in about 50 parts of chloroform, 2 parts of N-hydroxymethyl hexachloro-5-norbornene-2,3-dicarboxylic imide in the presence of boron trifluoride, which was employed at saturation in the mixture. The mixture was agitated at room temperature for about 4 hours. A product was recovered by addition to methanol, which was in the form of a colorless polymer showing strong carbonyl absorption at 1720 cm.$^{-1}$. Based on method of preparation, the product was a polystyrene having phenyl radicals substituted with hexachloro-5-norbornene-2,3-dicarbonyl imidomethyl radicals. The polymer was cast into a film from chloroform, which was converted to the insoluble state when exposed to ultraviolet light for about 20 seconds as described previously, in the presence of a 1% by weight benzophenone photoinitiator.

EXAMPLE 7

There was added to a solution of 1 part of a polychlorostyrene, EXP-MX4616 from Dow Chemical Company, in about 10 parts of chloroform, 0.24 part of N-hydroxymethylmaleimide. Boron trifluoride was passed into the resulting mixture at room temperature with stirring. Upon effecting a detectable increase in viscosity of the solution, methanol was added in an amount to effect the precipitation of product. Based on method of preparation, the product was a maleimidomethyl substituted polychlorostyrene. Elemental analysis of the product showed that it contained about 6 mole percent of maleimidomethyl substituted phenyl radicals.

A film of the product was cast from a chloroform solution containing a 1% concentration of benzophenone. There was obtained a film exhibiting a substantial increase in solvent resistance when it was exposed to ultraviolet light for a period of about 20 seconds. This established that the imido-substituted polystyrene could be employed as a photoresist.

Although the above examples are limited to only a few of the very many variables within the scope of the present invention, it should be understood that the present invention is directed to a method of making a much broader class of imido-substituted aromatic carbocyclic organic polymers by employing a compound of Formula 1 with organic polymer of Formulas 3 and 4 in the presence of an effective amount of a Friedel-Crafts' catalyst.

What is claimed is:

1. A method for making a molding compound or a solvent resistant coating compound by introducing imido-alkylene groups into film forming aromatic carbocyclic organic polymer which comprises, (1) effecting reaction between (A) an imido-alkylene compound of the formula,

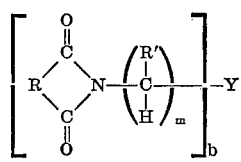

and (B) a film forming aromatic carbocyclic organic polymer consisting essentially of from about 5 to 500 chemically combined units selected from the group consisting of (a)

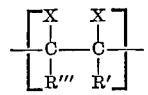

(b)

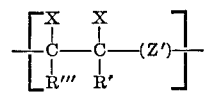

and (c) a mixture of (a) and (b)
    in the presence of an inert organic solvent and at least 1 mole percent of a Friedel-Crafts' alkylation catalyst based on the total moles of the aromatic carbocyclic radicals in said aromatic carbocyclic organic polymer, and (2) recovering an imido-alkylene-substituted aromatic carbocyclic organic polymer from the resulting reaction mixture, where (A) is employed in such reaction mixture in an amount which is sufficient to introduce at least 6 mole percent of imido-alkylene substitution into (B) based on the total moles of (B) units to increase its softening temperature as a molding composition compared to (B) free of such imido-alkylene substitution, R is a divalent hydrocarbon radical free of aliphatic unsaturation selected from the group consisting of hydrocarbon radicals, and halogenated hydrocarbon radicals, R' is selected from the group consisting of hydrogen and monovalent hydrocarbon radicals, R''' is a monovalent aromatic carbocyclic radical, Y is selected from the group consisting of hydroxy and oxygen radicals, $m$ is an integer having the value of from 1 to 4 inclusive, $b$ is 1 or 2, Z' is a divalent organo radical selected from the group consisting of

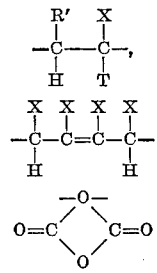

and

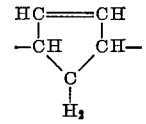

and mixtures thereof, Q is a polyvalent aliphatic radical, T is selected from the group consisting of halogen radicals, aliphatic ester radicals, aromatic ester radicals, amido radicals, nitrile radicals, and aliphatic nitrile radicals, and X is selected from the group consisting of hydrogen, alkyl, radicals and mixtures thereof.

2. A method in accordance with claim 1, where the organic polymer is polystyrene.

3. A method in accordance with claim 1, where the organic polymer is a styrene butadiene copolymer.

4. A method in accordance with claim 1, where the organic polymer is a terpolymer of acrylonitrile butadiene and styrene having at least 10 mole percent of chemically-combined styryl units.

5. A method in accordance with claim 1, where the organic polymer is a copolymer of styrene and maleic anhydride.

6. A method in accordance with claim 1, where the imido-methylene compound is a phthalimido-methylene compound.

7. A method in accordance with claim 1, where the Friedel-Crafts' alkylation catalyst is boron trifluoride.

8. A method for making a molding compound or a solvent resistant coating compound by introducing imido-alkylene groups into film forming aromatic carbocyclic organic polymer which comprises, (1) effecting reaction between (C) and imido-alkylene of the formula,

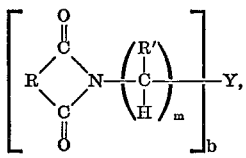

and (D) a film forming aromatic carbocyclic organic polymer consisting essentially of from about 5 to 500 chemically combined units selected from, (a)

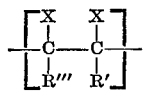

(b)

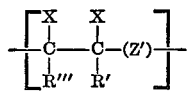

and (c) a mixture of (a) and (b)

in the presence of an inert organic solvent and at least 1 mole percent of a Friedel-Crafts' alkylation catalyst based upon the total moles of the aromatic carbocyclic radicals in said organic polymer, and (2) recovering an imido-alkylene-substituted aromatic carbocyclic organic polymer from the resulting reaction mixture where (C) is employed in such reaction mixture in an amount which is sufficient to introduce at least 6 mole percent of imido-alkylene-substitution into (D) to render it thermoset when utilized with a free radical initiator based on the total moles of units in (D), as compared to (D) free of such imido-alkylene-substitution, R is an aliphatically unsaturated divalent organo radical selected from the group consisting of hydrocarbon radicals and halogenated hydrocarbon radicals, R' is selected from the group consisting of hydrogen and monovalent hydrocarbon radicals, R''' is a monovalent aromatic carbocyclic radical, Y is selected from the group consisting of halogen and hydroxy radicals, m is an integer having the value of from 1 to 4 inclusive, b is 1 or 2, Z' is a divalent organo radical selected from the group consisting of

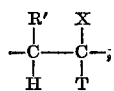

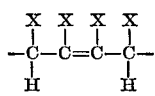

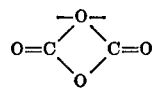

and

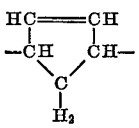

and mixtures thereof, Q is a polyvalent aliphatic radical, T is selected from the group consisting of halogen radicals, aliphatic ester radicals, aromatic ester radicals, amido radicals, nitrile radicals, and aliphatic nitrile radicals, and X is selected from the group consisting of hydrogen, alkyl radicals, and mixtures thereof.

9. A method in accordance with claim 8, where the aromatic carbocyclic organic polymer is halogenated polystyrene.

10. A method in accordance with claim 8, where the imido alkylene compound is a halogenated imido alkylene compound.

11. A method in accordance with claim 8, where the imido alkylene compound is an imido alkylene ether.

12. A method in accordance with claim 8, where the imido-methylene compound is a maleimido-methylene compound.

13. A method in accordance with claim 8, which comprises (1) effecting contact between polystyrene and maleimido-methylenechloride in the presence of an effective amount of boron trifluoride, and (2) recovering from the resulting mixture polystyrene having chemically-combined maleimido-methylene radicals.

14. A method in accordance with claim 8, where the aromatic carbocyclic organic polymer is halogenated polystyrene.

15. A method in accordance with claim 8, where the imido-alkylene compound is a halogenated imido-alkylene compound.

16. A method in accordance with claim 8, where the imido-alkylene compound is an imido-alkylene ether.

17. A method in accordance with claim 8, where the organic polymer is polystyrene.

18. A method in accordance with claim 8, where the organic polymer is a styrene-butadiene copolymer.

19. A method in accordance with claim 8, where the organic polymer is a acrylonitrile-butadiene-styrene terpolymer having at least 10 mol percent of chemically combined styryl units.

20. A method in accordance with claim 8, where the organic polymer is a copolymer of styrene and maleic anhydride.

References Cited
UNITED STATES PATENTS

| | | | |
|---|---|---|---|
| 2,989,504 | 6/1961 | Little | 260—78 UA |
| 3,301,826 | 1/1967 | Tawney | 260—78 UA |

OTHER REFERENCES

Chemical Abstracts, vol. 54, 1960, pp. 24, 473g, Gornostaeva et al.

Chemical Abstracts, vol. 68, 1968, pp. 86, 944z, Rabusic et al.

Journal of Organic Chemistry, vol. 26, 1961, pp. 15–21, Tawney et al.

Tetrahedron Letters, No. 50, 1968, pp. 5267–9, Sisido et al.

HAROLD D. ANDERSON, Primary Examiner

U.S. Cl. X.R.

204—159.14, 159.22; 260—30.2, 31.8 R, 32.6 N, 33.6 R, 33.8 R, 41 R, 78.5 R, 83.3, 85.1, 93.5 R, 824, 879, 884, 885, 897, 899, 901